United States Patent [19]

Hines et al.

[11] 4,406,164

[45] Sep. 27, 1983

[54] HARD BEARING, 2-PLANE, HORIZONTAL DYNAMIC BALANCER

[75] Inventors: Gordon E. Hines; Jack H. Kerlin, both of Ann Arbor, Mich.

[73] Assignee: Hines Industries, Inc., Ann Arbor, Mich.

[21] Appl. No.: 253,288

[22] Filed: Apr. 13, 1981

[51] Int. Cl.³ .................................... G01M 1/04
[52] U.S. Cl. ................................ 73/476; 73/487
[58] Field of Search ............ 73/462, 471, 473, 476, 73/477, 487, 460

[56] References Cited

U.S. PATENT DOCUMENTS

| | | | |
|---|---|---|---|
| 2,002,372 | 5/1935 | Greentree et al. | 73/462 X |
| 2,382,665 | 8/1945 | Riopelle et al. | 73/473 |
| 2,405,474 | 8/1946 | Van Degrift | 73/477 |
| 2,799,168 | 7/1957 | Federn et al. | 73/462 |
| 2,947,174 | 8/1960 | Lash | 73/464 |
| 4,063,461 | 12/1977 | Buzzi | 73/462 |
| 4,250,555 | 2/1981 | Mitchell et al. | 73/462 |

*Primary Examiner*—James J. Gill
*Attorney, Agent, or Firm*—Emch, Schaffer & Schaub Co.

[57] ABSTRACT

A hard bearing cradle balancing machine involving novel elements for workpiece support and end thrust restraint, angle of unbalance indication and machine mounted drill press slide. "V" block bearings incorporating independently tilting pads provide uniform journal contact without torsional restraint that would otherwise result from workpiece misalignment. A device magnetically attached to the end of the workpiece maintains axial positioning thereof and communicates rotational position and speed information to an electronic vibration analyzer, as well as rotational reference information to the machine operator. A balancer mounted drill press slide freely traverses the workpiece axis, locking up only upon application of drilling pressure at any point thereon.

12 Claims, 11 Drawing Figures

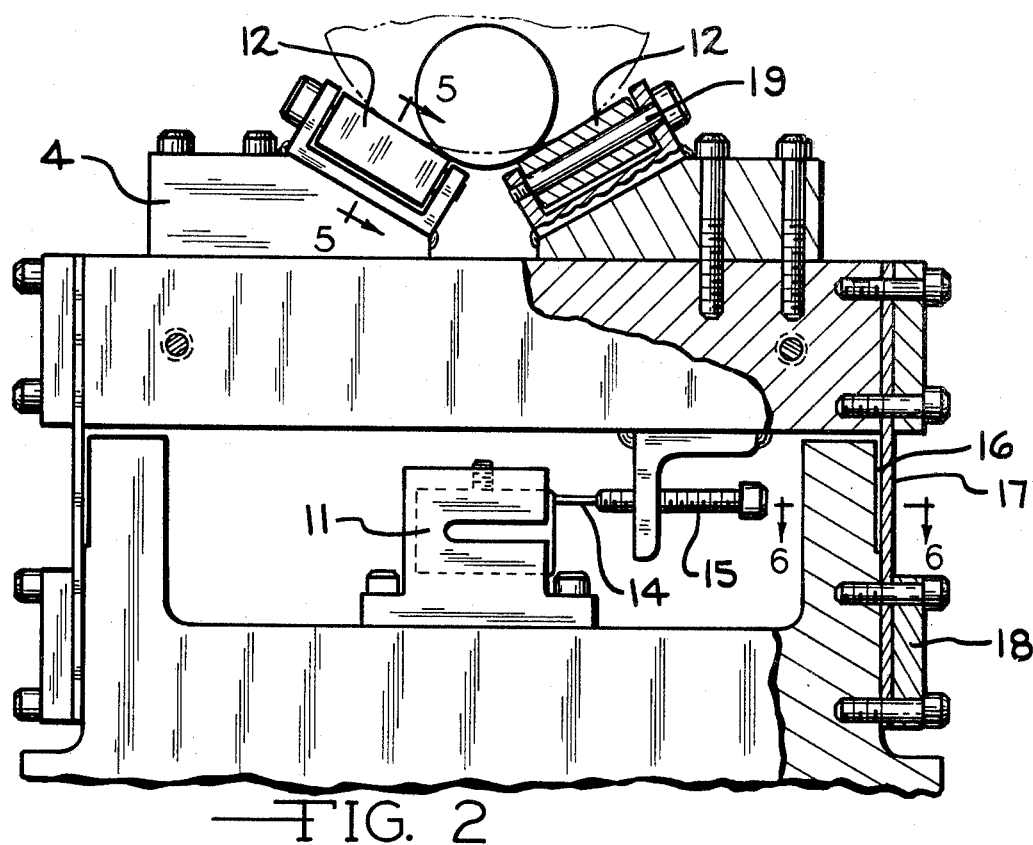
FIG. 2
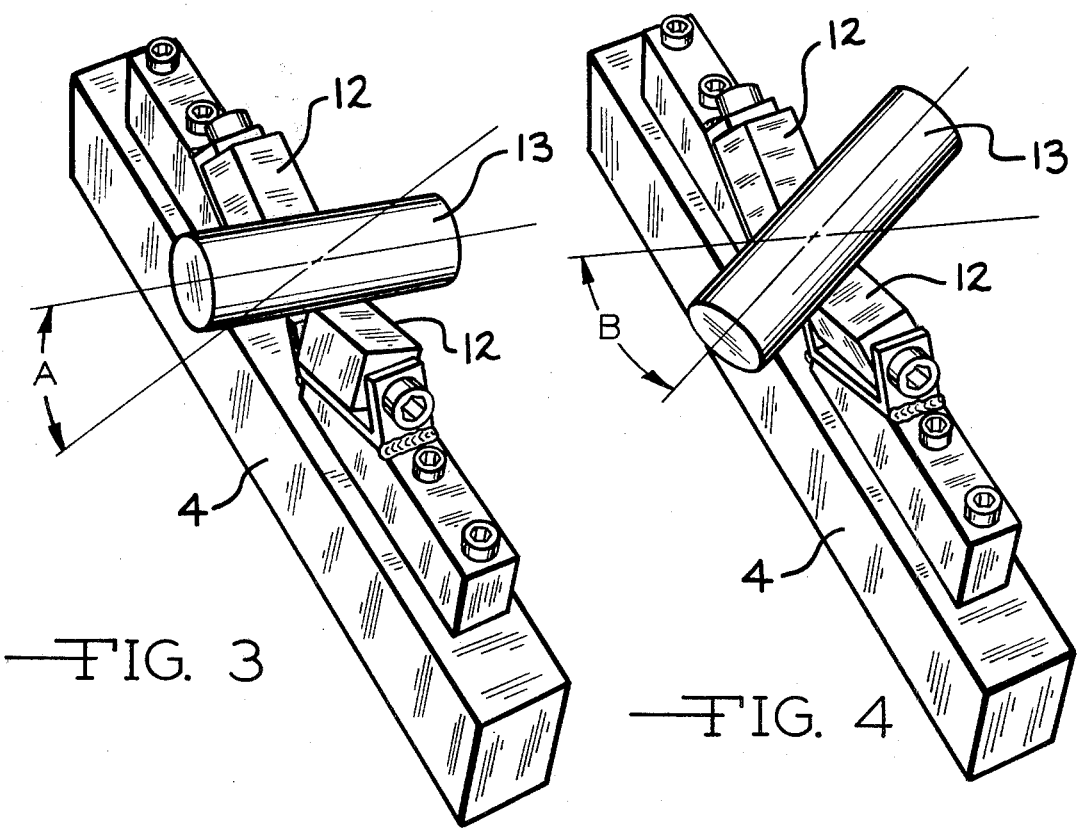
FIG. 3
FIG. 4

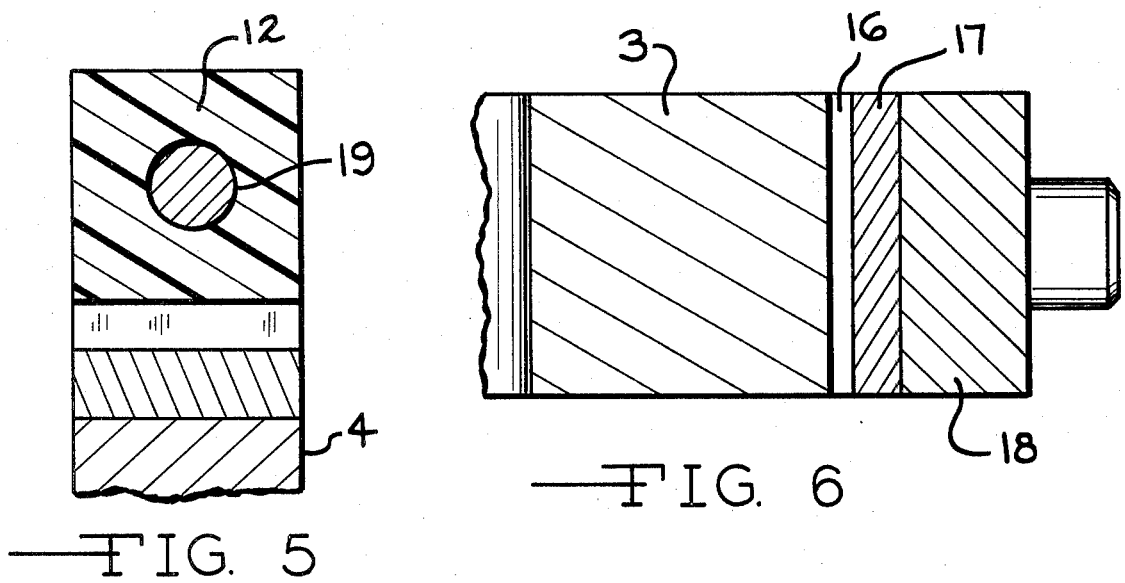
FIG. 5
FIG. 6
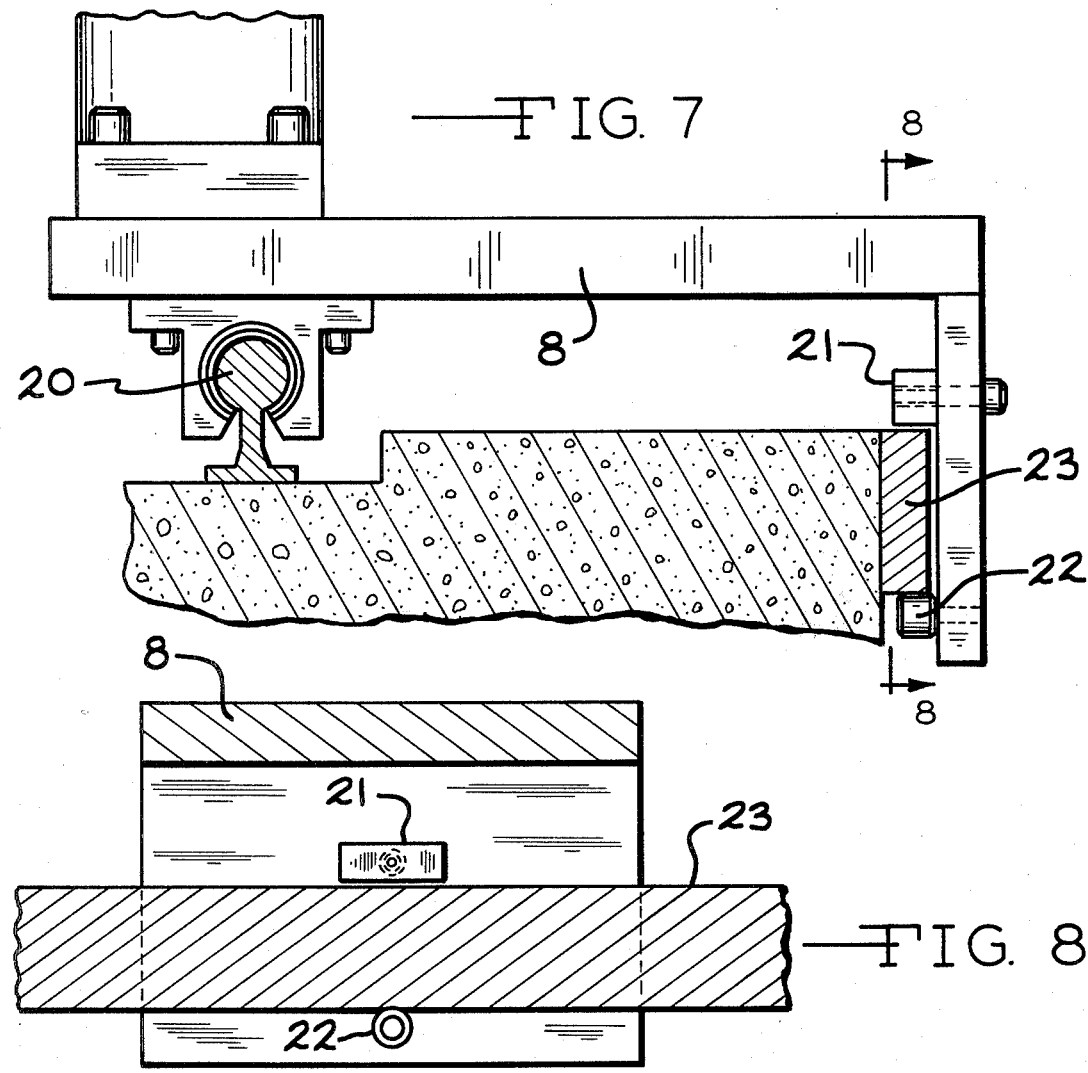
FIG. 7
FIG. 8

HARD BEARING, 2-PLANE, HORIZONTAL DYNAMIC BALANCER

This invention pertains to a means of balancing rotatable elements. Although not so limited, the invention has particular application in the balancing of machine parts having integral journals such as crankshafts and motor armatures.

FIELD OF INVENTION

Horizontal balancing machines have been developed for quite some time taking many varied forms, yet all possessing certain problems in common.

A rotatable element to be balanced, hereafter simply called "workpiece" must be supported in the balancer on its own journals to allow rotation about a geometric axis determined by the journal surface. There are typically two means of supporting the journals: between ball bearing rollers or in "V" blocks. When rollers are used, it is required that they rotate with high precision with respect to radial runout to avoid describing a fluctuating axis of rotation other than that described by the journal surfaces. In addition, alignment of the rollers' axis parallel to the workpiece axis is critical in preventing axial thrust produced by the screwing tendency of rollers. "V" blocks eliminate the runout and axial thrust problems of rollers but introduce higher turning resistance due to friction. They also require self-aligning capability in order to distribute surface wear and unit loading in spite of workpiece misalignment. A further necessity for self-aligning properties is the reduction of torsional restraint on the journal that would adversely affect measurement of unbalance, particularly in 2-plane balancing applications.

Proper alignment of rollers is facilitated by a freely suspended bearing carrier in so-called "soft-bearing" balancing machines. Technological advances in recent years in measuring minute vibration displacements has made the "hard bearing" machine practical with its attendent advantages to the machine operator. Maintaining roller alignment in a hard bearing balancer presents greater difficulty. Crowned rollers must be used to allow torsional freedom, but the high, unit loading due to the point contact of the crown can sometimes damage journal surface finishes. A preferred approach in hard-bearing balancers is the "V" block journal support. An assortment of movable arms, end-thrust rollers, hinged joints, etc. have been devised to alleviate the problems associates with rollers and "V" blocks.

An area of concern common to all balancing machines is the provision of rotational position information to the instrumentation and machine operator alike. The vibration measuring device, hereafter "instrument", must receive a reference signal from the rotating workpiece with which to relate the vibration signal. These two signals combine to indicate location or angle of unbalance to the machine operator via some instrument display means, such as an angle meter or strobe light. The operator makes a balance correction at the indicated location relative to some reference point on the workpiece.

Targets, angle rings, strobe-illuminated reference marks and pointers have conventionally supplied such a reference point. The necessity of having to attach to various workpiece configurations comprises accuracy and ease of obtaining positional information. In many cases, workpiece rotational speed information is also required for proper instrument operation.

Balance corrections may be specified at any point along the workpiece axis. In most cases, the workpiece is removed from the balancer for correction process, such as grinding or drilling, then returned to the balancer for a balance check. Several course-to-fine corrections may require repeated loading and unloading of the balancer. This time-consuming method can be remedied by mounting the correction device, such as a drill press, directly on the balancer with the workpiece free to move along the workpiece axis to any point where correction is desired. In instances where this approach has been tried, complicated locking devices are employed to assure drill press stability during the drilling operation.

SUMMARY OF THE INVENTION

The present invention treats the several areas previously mentioned relating to radial and axial workpiece support, transmission of workpiece rotational position and speed, indication of unbalance location, and an on-machine unbalance correction method.

The balancing machine incorporating the improvements comprising this invention is of the hard-bearing type, although not necessarily limited thereto.

"V" block type journal supports are utilized. Where the opposing bearing faces of conventional "V" blocks are spatially fixed relative to one another, a novel feature of this invention is the independent and free positioning of opposing faces with a misaligned journal assuring continuous bearing contact. The movable opposing faces, or tilting pads, are pivoted in a manner as to permit rigidity and conduction of unbalance forces from the journal to the suspended bearing carrier.

Another aspect of this invention relates to maintaining axial positioning of the workpiece on the "V" block bearing. A small shaft mounted in bearings, radially and axially fixed thereby, oriented parallel and coincidental with the workpiece journal axis, communicates mechanically with an end of the workpiece via a radially flexible but axially rigid intermediate shaft. Any axial thrust acting on the workpiece is transmitted by the intermediate shaft to the fixed shaft thus axially restraining the workpiece while allowing radial freedom.

The mechanical attributes of this so-called end thrust device lend themselves to other useful functions comprising features of this invention. By fitting the above mentioned fixed shaft with a disc centered and free to rotate thereon, workpiece position reference and speed information may be transmitted electrically through the imposition of conventional encoder sensors from the rotating disc to the measuring instrument. In addition, the disc serves as a visual indicator to the machine operator of the location of workpiece unbalance corresponding to angle information displayed or indicated by the instrument.

A further improvement of balancing machines encompassed by this invention is the mounting of a drill press on the balancer by means of a free moving slide configured to lock-up when a particular directional force produced by drilling is applied to the drill press slide. The slide moves along two parallel rails. One rail accommodates low friction linear bearings on the slide which are positioned as to support almost the entire drill press weight, and also serve to guide the slide along the track rigidly in two degrees of freedom. The third degree of freedom is maintained by the other track acting on a friction bearing surface on the slide. Because almost all weight force bears upon the free-moving linear bearing, this friction bearing surface presents only slight resistance to slide movement. But during a drilling operation, the force so developed acts to decrease the load on the linear bearings and increase the load on the friction bearing. This application of predetermined forces relative to bearing characteristics, location and loading forms an inherent automatic lock-up system in the drill press slide.

BRIEF DESCRIPTION OF THE DRAWINGS

FIG. 2 shows workpiece support and bearing assembly.

FIGS. 3 and 4 further amplify operation of the bearing assembly.

Cross-section of bearing block is shown in FIG. 5.
Spring mounting detail is shown in FIG. 6.
FIGS. 7 and 8 reveal drill press slide mount detail.
Angle indicator assembly detail is given in FIG. 9.
Opposite sides of angle disc are shown in FIGS. 10 and 11.

DESCRIPTION OF PREFERRED EMBODIMENTS

Figure 1:
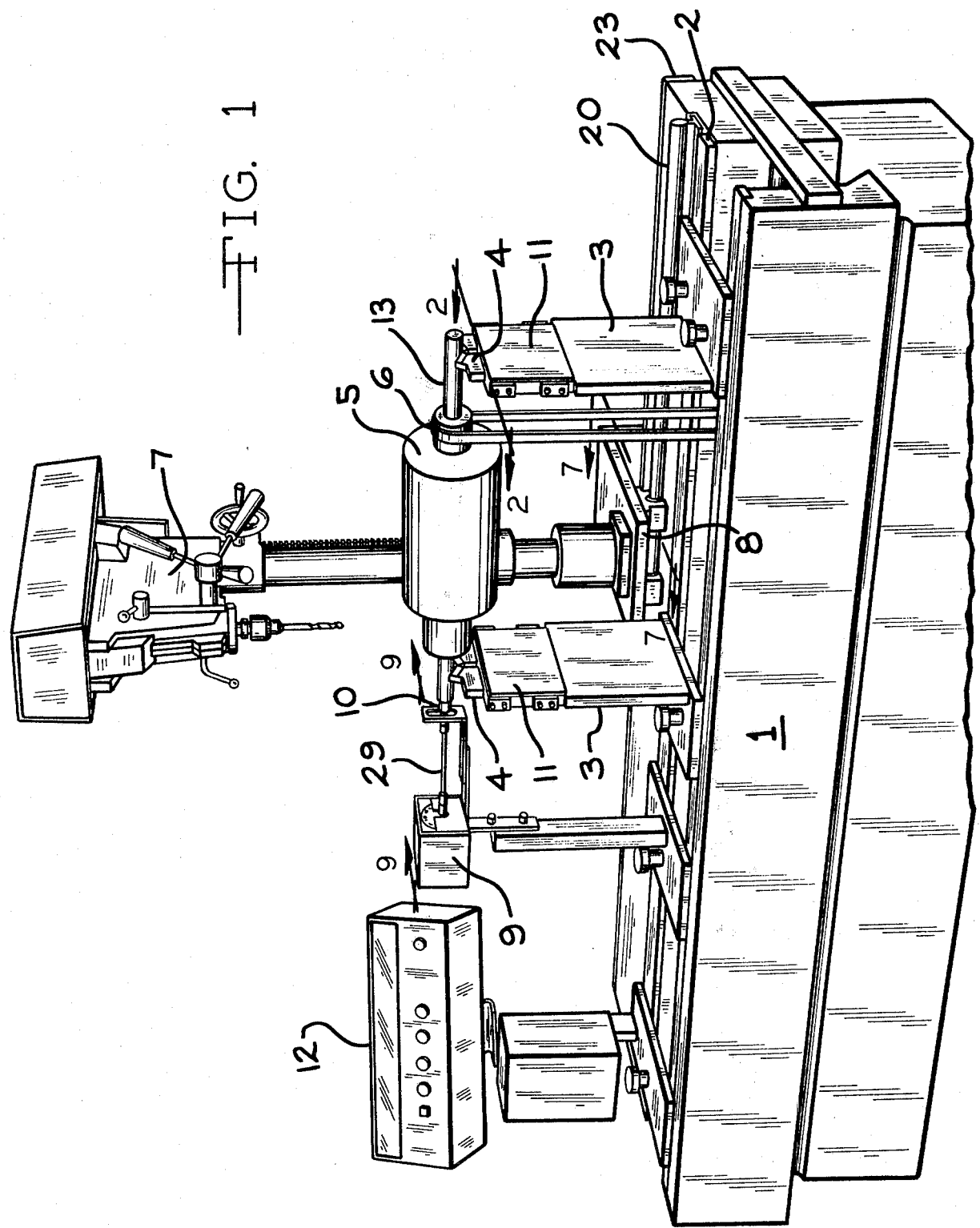
FIG. 1 is an overall view of the cradle balancer showing relationship of various subassemblies comprising this invention.

The assembly of novel features incorporated in the presently preferred embodiment of the invention is shown in FIG. 1. An examination of FIG. 1 will develop a general understanding of the functions and advantages of the invention. Referring to FIG. 1, a concrete machine bed 1 supports two stanchions 3 which are free to slide on rails 2 to accommodate various length workpieces 5. Journals 13 of the workpiece 5 rest in "V" block bearing assemblies 4 attached by springs to the stanchions 3. Workpiece 5 is caused to rotate by motor-driven belt 6. Vibration from rotating workpiece 5 is transmitted to displacement transducers 11 (see FIG. 2) hidden from view by protective covers. Angle indicator 9 mounted to rails 2 is positioned thereon to allow attachment of magnet 10 to end of workpiece 5. Magnet 10 communicates via shaft 29 workpiece 5 rotation information and axial forces to angle indicator 9. Drill press 7 mounted on slide 8 traverses workpiece 5 axis on rails 20 and 23 secured to concrete machine bed 1.

Vibration and rotational information from transducers 11 and angle indicator 9 respectively is transmitted electrically to measuring instrument 12. Instrument 12 displays balance correction amount and location to the machine operator. Correction location is referenced with workpiece 5 by angle indicator 9.

Referring to FIG. 2, bearing assembly 4 incorporates two bearing blocks 12 free to rotate about shafts 19. The bearing surface in contact with the workpiece journal is generally parallel with the axis of shafts 19. FIGS. 3 and 4 show workpiece journal 13 axis free to tilt on blocks 12 through vertical angle A and horizontal angle B while maintaining full surface contact between journal 13 and blocks 12. If the angle of shafts 19 were both either horizontal or vertical, only vertical or horizontal angles respectively of journal 13 axis would be possible without losing full bearing contact. By orienting shaft 19 axis relative to one another at an angle between 0 and 180 degrees, preferably 90-120 degrees, both horizontal and vertical angle components become available permitting journal 13 axis misalignment in any direction without losing full bearing contact.

Section 5—5 of bearing block 12 of FIG. 2 is shown in FIG. 5. Block 12 is preferably fabricated of low friction bearing material such as nylon, teflon or oil impregnated bronze.

FIG. 2 clearly shows how "V" block assembly 4 accommodates journal 13 misalignment in the general rotational plane of blocks 12 while remaining fixed in the journal 13 rotational plane. Vibration forces are thereby transmitted directly by block 12 through shaft 19 to bearing assembly mount 4.

FIG. 2 also shows overall mounting of bearing assembly 4 through springs 17 to stationary stanchions 3 (FIG. 1). FIG. 6 shows in detail section 6—6 of FIG. 2 wherein spring 17 is clamped by block 18 to stanchion 3. Length and width of gap 16 constitutes the free bending range of spring 17.

Vibration transducer 11 mounted to stanchion 3 senses vibration on pin 14 in contact with adjusting screw 15 mounted to bearing assembly 4. Gap 16 between springs 17 and the stanchion provide a travel stop for bearing assembly 4 to prevent damage to transducer 11. Pin 14 is spring loaded by transducer 11 in order to maintain continuous contact with screw 15. Screw 15 positions pin 14 to its approximate travel midpoint allowing displacement to either side thereof as it arises from vibration of bearing assembly 4.

FIG. 7 shows drill press slide 8 mounted on rails 20 and 23. Conventional low-friction linear bearings on rail 20 supports most of the drill press weight and provides rigidity in two degrees of freedom. A low friction bearing 22 such as a cam follower and friction block 21 in close proximity or contact with rail 23 provide rotational rigidity about the axis of rail 20. The drill press is located on slide 8 such that the total assembly mass center is to the left side of rail 20 centerline. Consequently the right side of slide 8 is biased upward against rail 23 through bearing 22. In this mode the drill press freely moves along rails 20 and 23 on low-friction bearings. During a drilling operation torque is generated about the axis of rail 20 forcing friction block 21 down on rail 23. The friction force so developed restrains movement of the slide along the rails only while drilling is in progress. FIG. 8 shows section 8—8 with bearing 22 in contact with rail 23, friction block separated therefrom by a small gap, in the non-drilling mode.

Figure 9:
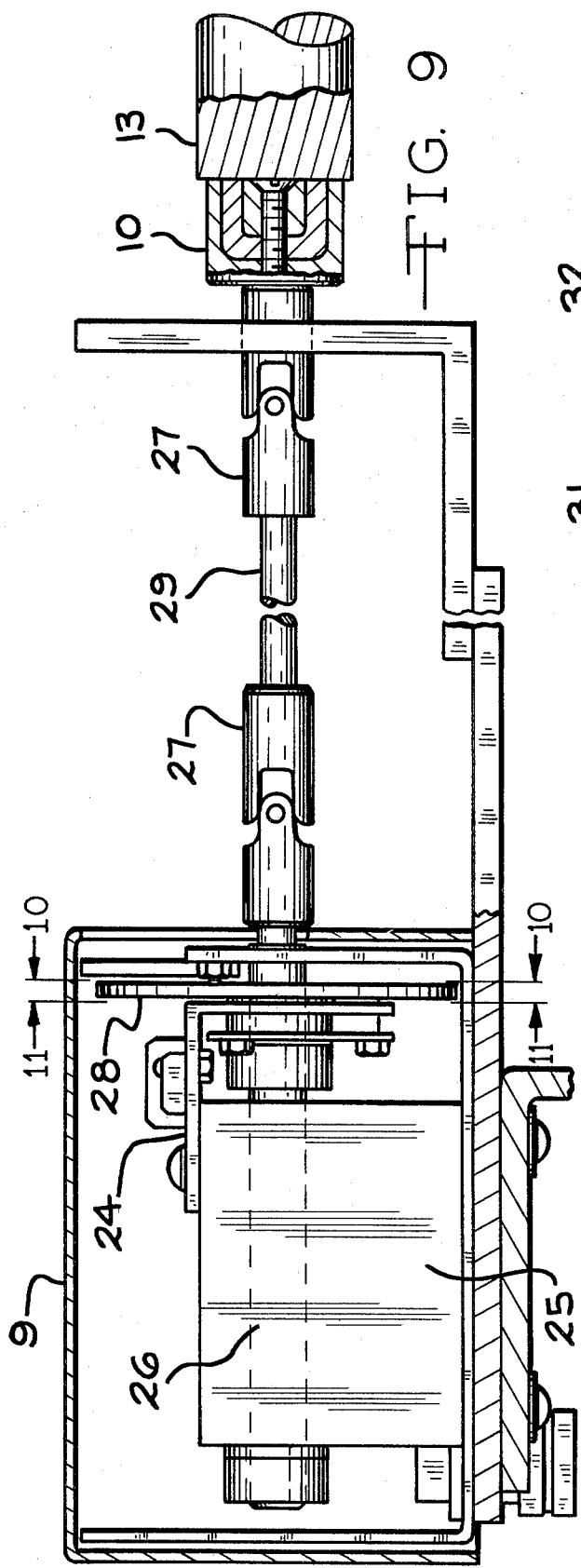

FIG. 9 shows angle indicator assembly 9. Magnet 10 attached magnetically to end of journal 13 transmits rotation and axial thrust of the workpiece through universal joints 27 and shaft 29 to shaft 26. Shaft 26 is restrained in all degrees of freedom except rotational by bearing housing 25 mounted by a support post to rails 2 on machine bed 1. Universal joints 27 permit radial and angular freedom of magnet 10 while remaining axially fixed. Thus magnet 10 is free to follow vibration motion, mechanical irregularities and misalignment of the workpiece without introducing adverse effects on unbalance measurement. Axial rigidity of magnet 10 maintains workpiece position in "V" blocks 4.

Figure 11:
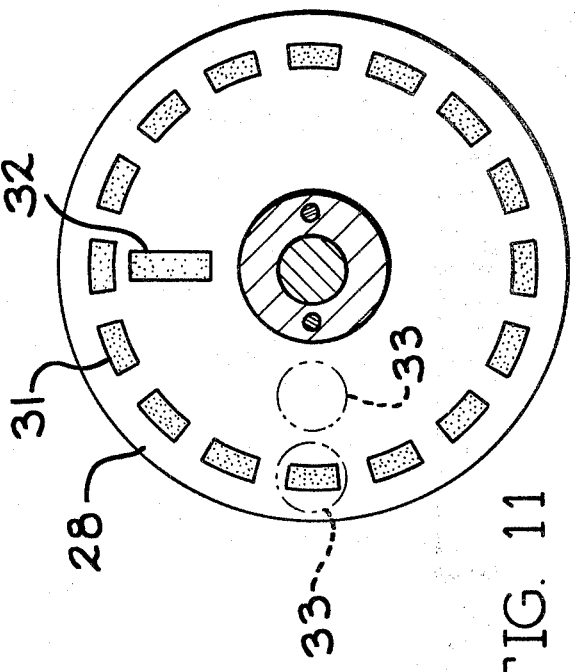
Figure 10:
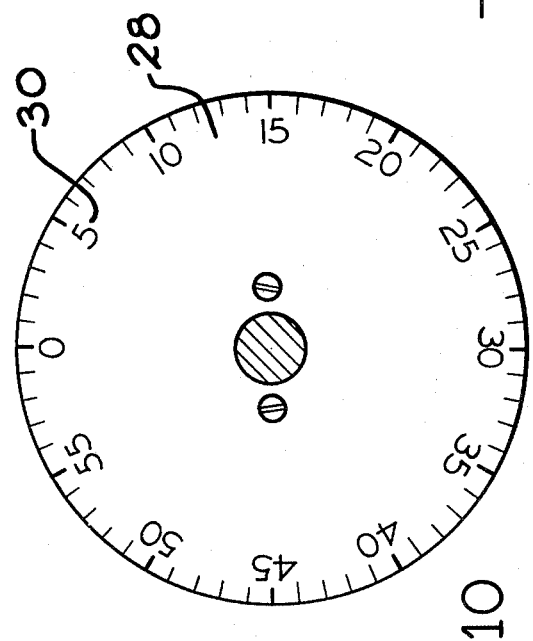

Circular disc 28 shown in FIG. 9 is represented in greater detail in FIGS. 10 and 11. The front face of disc 28 has circumferential graduation lines and numbers 30, shown 0–59 numbered in increments of five. A portion of disc 28 is easily visible to the machine operator by which he locates workpiece 5 unbalance corresponding to a number on the disc. The disc number 30 indicating location of unbalance is displayed by instrument 12.

The rear side of disc 28, shown in FIG. 11, contains concentric bands of segments 31 and 32. The segments may be differentiated from background as slots, protrusions, holes, contrasting colors, or by other means suitable for generating rotary encoder information. While two bands are shown, more or less may be required in particular cases. While not necessarily limited thereto, the present embodiment utilizes two bands of white segments on a black background. Two photo-type sensors 33, responsive to the contrasting reflectivity between segments and background, generate electrical pulses that are used by instrument 12 in analyzing amount and location of unbalance. Typically, the outer band of segments 31 provides rotational speed information for electronically tuning a filter and/or operating a tachometer. The inner band, shown with a single segment 32, provides positional information in determining unbalance location.

The preferred embodiment, as described above, is intended to be exemplary in nature and by no means limits the scope of modifications possible and apparent to those skilled in the art without materially departing from the intent and spirit of this invention.

What is claimed is:

1. A balancing machine for horizontally supporting a workpiece comprising: a machine bed; a first vertical stanchion mounted on said machine bed; a second vertical stanchion spaced from said first vertical stanchion and moveably mounted on said machine bed for variably positioning said second vertical stanchion in a predetermined location on said machine bed with respect to said first vertical stanchion; a first bearing assembly operatively fixed to said first vertical stanchion and a second bearing assembly operatively fixed to said second vertical stanchion, said first and second bearing assemblies each respectively including first and second bearing blocks rotatably mounted on first and second axes, said first axis of each bearing assembly angularly positioned with respect to said second axis of each bearing assembly for generally forming a V-shape, each of said bearing blocks having a planar bearing surface for contacting the workpiece, said planar bearing surfaces being generally parallel with said respective axes supporting said bearing blocks, whereby said bearing blocks independently rotate upon said axes to maintain optimum surface contact with the workpiece irrespective of vertical and horizontal misalignment of the workpiece between said first bearing assembly and said second bearing assembly; and means for rotating the workpiece as the workpiece is supported by said bearing blocks.

2. The balancing machine of claim 1 wherein said first vertical stanchion is moveably mounted on said machine bed for further variably positioning of said first vertical stanchion with respect to said moveable second vertical stanchion.

3. The balancing machine of claim 1 wherein said first axis of each bearing assembly is angularly disposed with respect to said second axis of each bearing assembly at an angle of between 90° and 120°.

4. The balancing machine of claim 1 wherein said first bearing assembly is operatively connected to said first vertical stanchion through a first resilient means and said second bearing assembly is operatively connected to said second vertical stanchion through a second resilient means, whereby any vibrational forces acting on the workpiece as the workpiece is rotated which are received by said bearing surfaces of said bearing blocks will act on said first and second bearing assemblies in a responsive manner and cause said first and second bearing assemblies to vibrate without imparting any vibrational motion to said first and second vertical stanchions.

5. The balancing machine of claim 4 wherein said first resilient means is removably connected to said first bearing assembly and said first vertical stanchion and said second resilient means is removably connected to said second bearing assembly and said second vertical stanchion, whereby said first and second resilient means may be removed and replaced.

6. The balancing machine of claim 4 further including a first vibration transducing means fixed to said first vertical stanchion and contacting said first bearing assembly for measuring the vibrational forces acting on said first bearing assembly and a second vibration transducing means fixed to said second vertical stanchion and contacting said second bearing assembly for measuring the vibrational forces acting on said second bearing assembly.

7. The balancing machine of claim 6 wherein said first and second vibration transducing means each include a vibration sensing means resiliently urged into continuous communication with said respective first and second bearing assemblies for providing a continuous and accurate measurement of the vibrational forces acting on said first and second bearing assemblies.

8. The balancing machine of claim 1 wherein said means for rotating said workpiece includes a motor mounted on said machine bed and a belt means in communication with said motor and the workpiece, said motor driving said belt to rotate the workpiece.

9. The balancing machine of claim 8 further including a workpiece angle indicator means mounted on said machine bed and in communication with one end of the workpiece, said angle indicator means being axially fixed to restrain axial movement of the workpiece along the workpiece axis and rotationally and angularly adapted for following motion irregularities of the workpiece caused by vibrational forces and misalignment of the workpiece as the workpiece is rotated.

10. The balancing machine of claim 9 wherein said angle indicator means further includes a magnetic coupling means for attaching to an end of the workpiece without impairing the rotational motion of the workpiece.

11. The balancing machine of claim 10 wherein said angle indicator means includes disc means positioned to rotate in conjunction with the workpiece, said disc having a first face circumferentially marked for providing an operator of said balancing machine with workpiece positional reference information, said disc further having a second face opposed to said first face, said second face having means to generate rotary encoder information for transmission to an encoder sensing means for analyzing amounts and locations of rotational imbalance of the workpiece and for providing rotational speed information of the workpiece.

12. A balancing machine for horizontally supporting a workpiece comprising: a machine bed; a first bearing means mounted on said machine bed; a second bearing means spaced from said first bearing means and moveably mounted on said machine bed, said first and second bearing means supporting the workpiece; means for rotating the workpiece as the workpiece is supported on said first and second bearing means; means for measuring any vibrational forces acting on the workpiece as the workpiece is rotated; and a workpiece angle indicator means mounted on said machine bed and in communication with the workpiece independent from said rotating means, said angle indicator means being fixed to restrain axial movement of the workpiece along the workpiece axis and rotationally and angularly adapted for following any motion irregularities of the workpiece caused by vibration forces and misalignment of the workpiece as the workpiece is rotated by said rotating means, said angle indicator means further including a magnetic coupling means for attaching to an end of the workpiece without impairing the rotational motion of the workpiece.

* * * * *